United States Patent [19]
Asanuma et al.

[11] Patent Number: 5,576,957
[45] Date of Patent: Nov. 19, 1996

[54] CONTROL SYSTEM FOR A FRONT AND REAR WHEEL STEERING VEHICLE

[75] Inventors: Nobuyoshi Asanuma; Kiyoshi Wakamatsu; Manabu Ikegaya, all of Saitama-ken, Japan

[73] Assignee: Honda Giken Kogyo Kabushiki Kaisha, Tokyo, Japan

[21] Appl. No.: 396,543

[22] Filed: Mar. 1, 1995

[30] Foreign Application Priority Data

Mar. 2, 1994 [JP] Japan .................. 6-058160

[51] Int. Cl.⁶ .............. B62D 5/04; B62D 7/14
[52] U.S. Cl. ............. 364/424.05; 364/426.03; 180/197; 180/412; 180/446
[58] Field of Search .......... 364/424.05, 426.01, 364/426.02, 426.03, 571.01, 571.02, 571.07, 580; 180/141, 142, 143, 79.1, 412, 415, 422, 446; 280/91

[56] References Cited

U.S. PATENT DOCUMENTS

| | | | |
|---|---|---|---|
| 4,552,239 | 11/1985 | Kanazawa et al. | 180/140 |
| 4,666,013 | 5/1987 | Shibahata et al. | 180/141 |
| 4,706,771 | 11/1987 | Kawabe et al. | 180/415 |
| 4,706,979 | 11/1987 | Kawabe et al. | 280/91 |
| 4,718,685 | 1/1988 | Kawabe et al. | 280/91 |
| 4,830,127 | 5/1989 | Ito et al. | 180/446 |
| 4,834,205 | 5/1989 | Mizuno et al. | 364/424.05 |
| 4,840,389 | 6/1989 | Kawabe et al. | 180/415 |
| 4,858,134 | 8/1989 | Eto et al. | 364/424.05 |
| 4,875,540 | 10/1989 | Oshita et al. | 180/446 |
| 4,878,557 | 11/1989 | Shibahata et al. | 180/415 |
| 4,951,199 | 8/1990 | Whitehead | 364/424.05 |
| 4,966,249 | 10/1990 | Imaseki | 180/233 |
| 4,971,173 | 11/1990 | Takahashi | 180/412 |
| 5,014,801 | 5/1991 | Hirose | 180/412 |
| 5,097,420 | 3/1992 | Morishita | 364/424.05 |
| 5,151,860 | 9/1992 | Taniguchi et al. | 364/424.05 |
| 5,155,686 | 10/1992 | Shiraishi et al. | 364/426.03 |
| 5,198,981 | 3/1993 | Collier-Hallman | 364/424.05 |
| 5,225,984 | 7/1993 | Nakayama | 364/424.05 |
| 5,236,335 | 8/1993 | Takeuchi et al. | 180/446 |
| 5,251,135 | 10/1993 | Serizawa et al. | 364/424.05 |
| 5,257,828 | 11/1993 | Miller et al. | 180/446 |
| 5,267,160 | 11/1993 | Ito et al. | 364/424.05 |
| 5,274,555 | 12/1993 | Fukunaga et al. | 364/424.05 |
| 5,313,389 | 5/1994 | Yasui | 364/424.05 |
| 5,347,458 | 9/1994 | Serizawa et al. | 364/424.05 |
| 5,360,077 | 11/1994 | Nishimoto et al. | 180/446 |
| 5,386,365 | 1/1995 | Nagaoka | 364/424.05 |
| 5,388,658 | 2/1995 | Ando et al. | 180/197 |

*Primary Examiner*—Kevin Tesh
*Assistant Examiner*—Tan Nguyen
*Attorney, Agent, or Firm*—Weiner, Carrier & Burt, P.C.; Joseph P. Carrier; Irving M. Weiner

[57] ABSTRACT

In a control system for a front and rear wheel steering vehicle which steers the rear wheels so as to cancel a deviation of an actual yaw rate from a standard yaw rate which can be computed from the steering input, the vehicle speed and other parameters, there is provided a feature to automatically and manually cancel the yaw rate feedback control. If the actual yaw rate continues to exceed a threshold level for more than a certain time period, the yaw rate feedback is canceled gradually so as not to cause any abrupt change in the handling of the vehicle. Alternatively, if the vehicle operator wishes to operate the vehicle under extreme conditions, he may manually cancel the yaw rate feedback control so as to avoid undesirable interference or conflict between the manual steering effort and the yaw rate feedback control action. Thus, the maneuverability of the vehicle under extreme conditions can be improved without losing the benefits of the yaw rate feedback control.

19 Claims, 20 Drawing Sheets

CONTROL SYSTEM FOR A FRONT AND REAR WHEEL STEERING VEHICLE

TECHNICAL FIELD

The present invention relates to a control system for a front and rear wheel steering vehicle, and in particular to a control system for a front and rear wheel steering vehicle which detects the yaw rate of the vehicle and conducts a feedback control of the rear wheel steering angle according to the detected yaw rate of the vehicle.

BACKGROUND OF THE INVENTION

It was previously proposed in the copending United States patent application Ser. No. 08/122,615 filed Sep. 16, 1993, U.S. Pat. No. 5,528,497; Ser. No. 08/161,139 filed Dec. 2, 1993, U.S. Pat. No. 5,448,481; Ser. No. 08/218,134 filed Mar. 25, 1994, U.S. Pat. No. 5,448,482; Ser. No. 08/218,116 filed Mar. 25, 1994, U.S. Pat. No. 5,481,457; and Ser. No. 08/218,135 filed Mar. 25, 1994 to compute a deviation of the actual yaw rate of the vehicle from a standard yaw rate determined according to the steering angle of the steering wheel and the vehicle speed, and carry out a feedback control of the rear wheel steering angle for the purpose of optimizing the dynamic response of the vehicle, and removing the adverse influences of the external disturbances and the changes in the running conditions of the vehicle on the behavior of the vehicle. The contents of these copending applications are incorporated in the present application by reference.

When the limit of the road gripping capability of a tire is exceeded on a road surface having a low frictional coefficient such as a gravel road and an icy road, the cornering force is dramatically reduced. Also, in a front and rear wheel steering vehicle, if abrupt and large-angle steering maneuvers are continued on a winding road, the capability of the rear wheel steering actuator to respond to the control command could be lost clue to the shortage of power of the actuator for steering the rear wheels. In such situations, according to the previously proposed steering systems, some discrepancies (which may be sensed as a phase difference) may be produced between the actual rear wheel steering angle produced by the yaw rate feedback control, and the anticipation or the expectation of the vehicle operator. This is not desirable because the vehicle operator should be the ultimate controller of the vehicle, and should be able to accurately grasp the condition of the vehicle at all times to the end of comfortably and safely operating the vehicle.

BRIEF SUMMARY OF THE INVENTION

In view of such problems of the prior art, a primary object of the present invention is to provide a control system for a front and rear wheel steering vehicle which allows the vehicle to be operated in a stable fashion under all conditions.

A second object of the present invention is to provide a control system for a front and rear wheel steering vehicle Which allows the vehicle to be operated in a favorable manner even under extreme road surface conditions.

A third object of the present invention is to provide a control system for a front and rear wheel steering vehicle which allows the vehicle to be operated in a stable manner under normal condition, but can allow extreme maneuvers to be taken when necessary.

A fourth object of the present invention is to provide a control system for a front and rear wheel steering vehicle which can eliminate mutual interference between the behavior of the vehicle and the control effort of the vehicle operator in making turning maneuvers under extreme conditions.

A fifth object of the present invention is to provide a control system for a front and rear wheel steering vehicle which can operate normally even when the actuator for the rear wheel steering device is not capable of producing the power demanded by the control system.

According to the present invention, these and other objects can be accomplished by providing a control system for a front and rear wheel steering vehicle, comprising: steerable front road wheels adapted to be steered by a steering wheel via a front wheel steering device; steerable rear road wheels adapted to be steered by a rear wheel steering actuator; standard yaw rate computing means for determining a standard yaw rate according to operating conditions of the vehicle including a steering angle of the steering wheel; yaw rate detecting means for detecting an actual yaw rate of the vehicle; feedback control means for controlling the rear wheel steering actuator according to a deviation of the actual yaw rate from the standard yaw rate; and canceling means for canceling the operation of the feedback control means. Typically, to improve the response speed of the control process, feedforward means is further provided for controlling the rear wheel steering actuator according to an input to the steering wheel.

Thus, when the running condition of the vehicle is somewhat extreme, the yaw rate feedback control for the rear wheels is canceled such that control of the rear wheel steering actuator is effected based on operation of the steering wheel, e.g., according to the signal from the feedforward means, but otherwise independent of auxiliary control action, and it is thus possible to operate the vehicle in a stable fashion under all conditions. Such extreme running conditions of the vehicle may include the cases where the road gripping capability of the road wheels has been exceeded, and the rear wheel steering actuator has become unable to promptly respond to the control command due to shortage of power. Also, the vehicle operator may be required to take extreme maneuvers intentionally in some cases, and, in such a situation, is prevented from fighting against the action of the control system by selectively canceling the operation of the control system as required. In other words, the control system of the present invention can allow such extreme maneuvers to be taken without detracting from the advantages of the yaw rate feedback control under normal operation condition.

The canceling means may consist of a manual switch, but may also consist of automated canceling means which effects a canceling operation for the yaw rate feedback control according to a result of comparison between the deviation of the actual yaw rate from the standard yaw rate and a first threshold level. Typically, the canceling means effects the canceling operation when the yaw rate deviation has continued to exceed the first threshold level for more than a certain time period. In either case, the canceling means may further comprise means for allowing the canceling operation by the canceling means to be effected gradually.

However, when the yaw rate deviation is sufficiently greater than the first threshold level so as to exceed a second threshold level, it is more desirable to immediately cancel the feedback control in view of preventing excessively extreme maneuvers to be taken. It is also desirable to restore the operation of the feedback control means when the yaw rate deviation has continued to stay below a third threshold level for a certain time period so that the benefits of the yaw rate feedback control may be regained as soon as it has become appropriate to do so. Again, to avoid any undesirable abrupt changes in the behavior of the handling of the vehicle, the resumption of the operation of the feedback control means should take place gradually.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
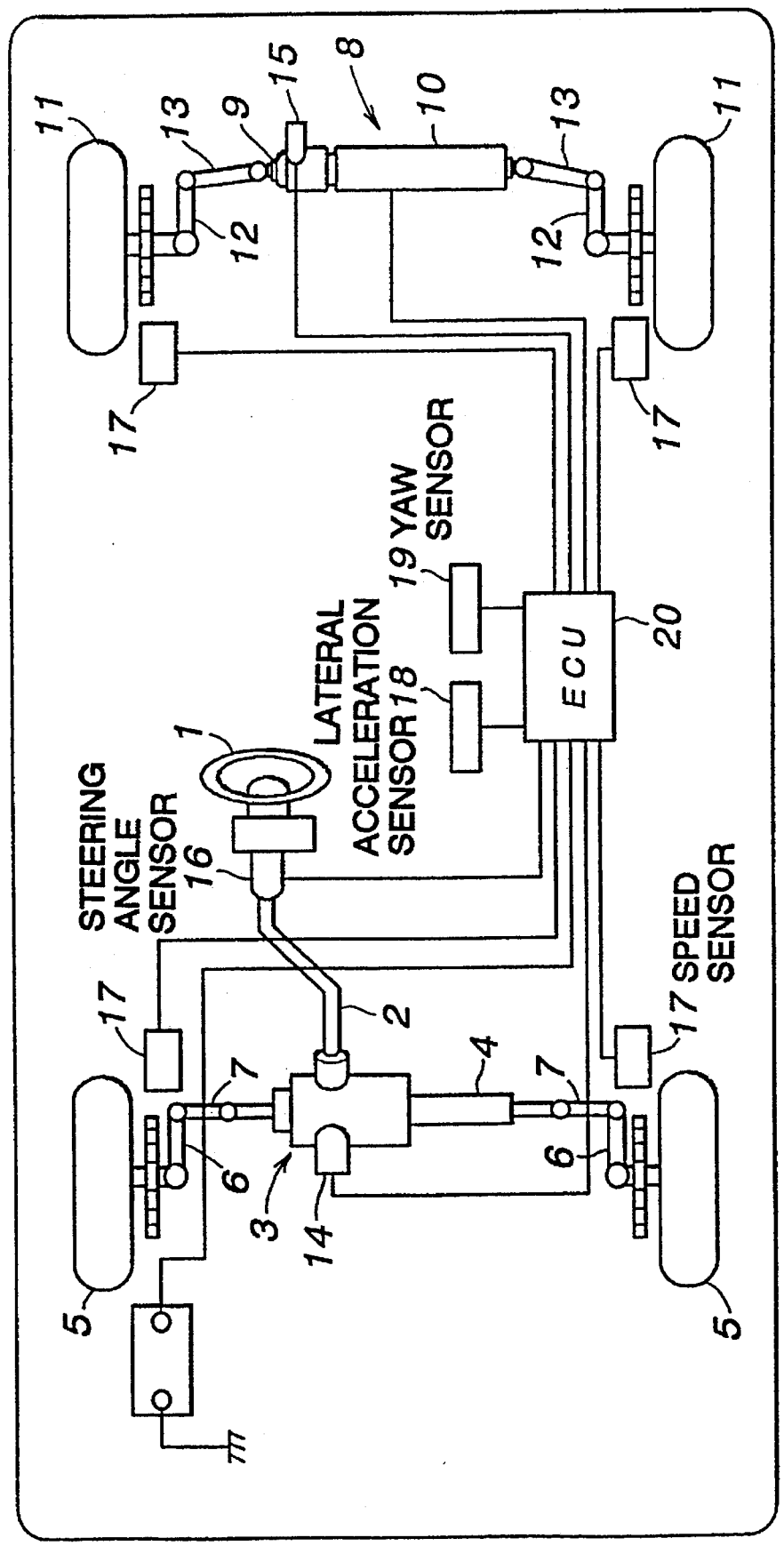
FIG. 1 is a diagram generally showing a four wheel steering vehicle to which the present invention is applied.

FIG. 1 shows the overall structure of a front and rear wheel steering device to which the present invention is applied. A steering wheel 1 is fixedly attached to the upper end of a steering shaft 2 which is in turn mechanically coupled to a steering rod 4 of a front wheel steering device 3 at its lower end. The two ends of the steering rod 4 are coupled to knuckle arms 6 of right and left front wheels 5 via tie rods 7.

A rear wheel steering device 8 is disposed in a rear part of the vehicle, and comprises an electric motor 10 for actuating a steering rod 9 extending laterally of the vehicle body. The two ends of the steering rod 9 are coupled to knuckle arms 12 of right and left rear wheels 11 via tie rods 13.

The front and rear wheel steering devices 3 and 8 are provided with steering angle sensors 14 and 15 for detecting the steering angles of the front and rear wheels 5 and 11 from the displacements of the steering rods 4 and 9, respectively. The steering shaft 2 is provided with a steering angle sensor 16 for sensing the steering angle of the steering wheel. The wheels 5 and 11 are each provided with a vehicle speed sensor 17, and a lateral acceleration sensor 18 and a yaw rate sensor 19 are provided in suitable locations of the vehicle body. These sensors 14 to 19 are electrically connected to a computer unit 20 for controlling the operation of the electric motor 10.

According to this steering system, as the vehicle operator turns the steering wheel 1, the steering rod 4 of the front wheel steering device 3 is mechanically actuated and the front wheels 5 are steered accordingly. At the same time, the steering angle of the steering wheel 1 and the displacement of the steering rod 4 are supplied to the computer unit 20 via the steering angle sensors 16 and 14, respectively. Thus, according to the input values of the front wheel steering angle, the vehicle speed, the lateral acceleration, and the yaw rate, the computer unit 20 determines the optimum steering angle of the rear wheels 11, and drives the electric motor 10 until the rear wheels 11 are steered to this optimum steering angle.

Figure 2:
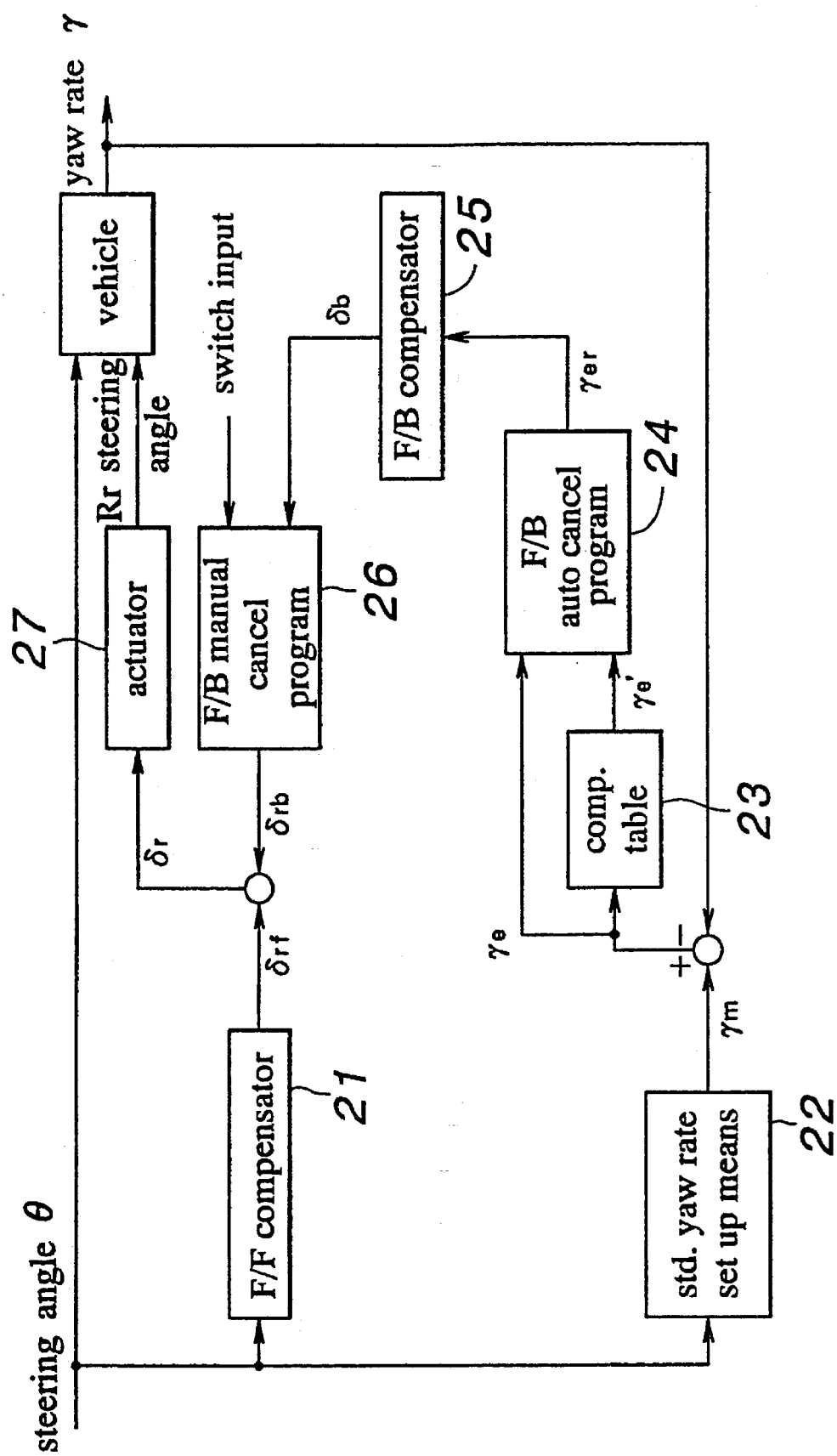
FIG. 2 is a block diagram showing the general principle of the system of the present invention.
Figure 3:
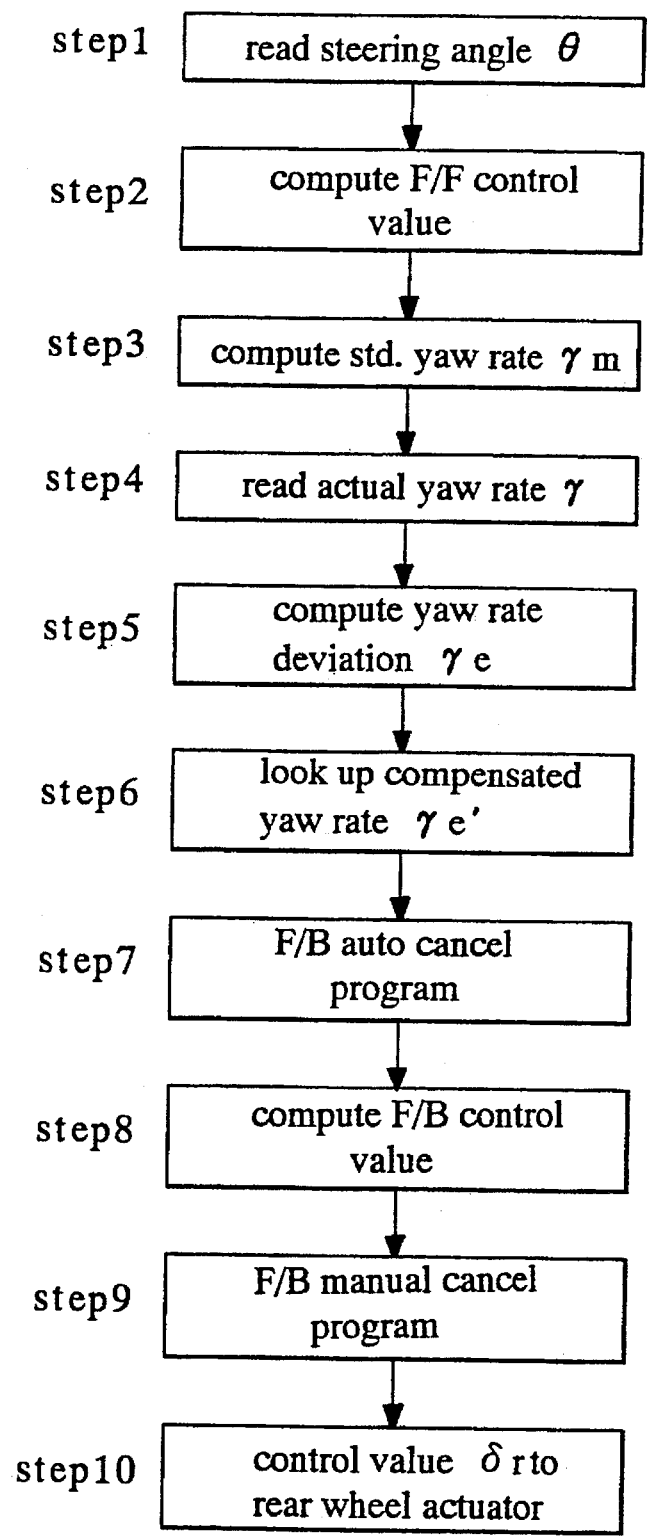
FIG. 3 is a flow chart of the control process carried out in the system of the present invention.

The flow of the control executed by the computer unit 20 is now described in the following with reference to FIGS. 2 and 3.

First of all, the steering angle θ of the steering wheel 1 is read in step 1. A feedforward compensator 21 computes a feedforward control value δ rf for each given steering wheel steering angle θ by taking into account the transfer function of a standard yaw rate determining unit 22 as well as the transfer functions of the steering device and the control circuit in step 2.

Then, the standard yaw rate γ m for the given steering wheel steering angle θ is computed according to a mathematical function programmed in the standard yaw rate determining unit 22 in step 3. At the same time, the actual yaw rate γ is read in step 4, and the deviation γe between the standard yaw rate γm and the actual yaw rate γ is computed in step 5. Then, a compensated yaw rate deviation γe' is obtained by modifying the yaw rate deviation γe according to a predetermined compensation table 23 in step 6.

Figure 4:
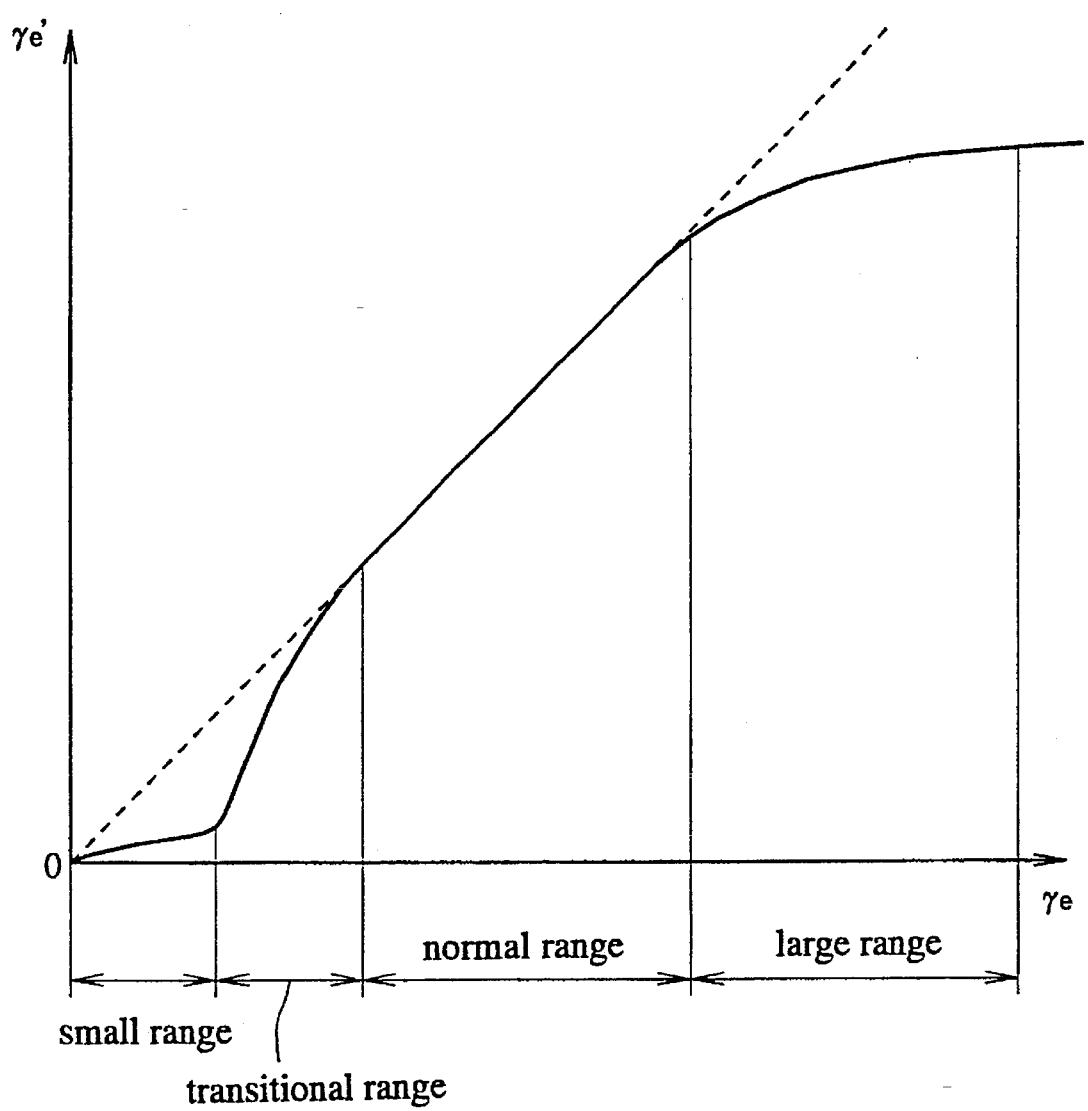
FIG. 4 is a graph showing the relationship between the actual yaw rate deviation γe and the compensated yaw rate deviation γe'.

Referring to FIG. 4, the compensation table 23 converts the yaw rate deviation γe' into the compensated yaw rate deviation γe which is smaller in value than the original yaw rate deviation γe in a region where the original yaw rate deviation γe is smaller than a first prescribed value to the end of eliminating the influences of spurious noises arising from small irregularities on the road surface. In a normal region where the actual yaw rate deviation is higher than the first prescribed value, the actual yaw rate deviation γe is simply produced as the compensated yaw rate deviation γe'. When the actual or original yaw rate deviation γe is higher than a second prescribed value which is higher than the first prescribed value, the compensation table 23 converts the actual yaw rate deviation γe' into the compensated yaw rate deviation γe which is again smaller than the actual yaw rate deviation γe with the aim of avoiding the overshooting of the feedback control.

The actual yaw rate deviation γe and the compensated yaw rate deviation γe' are supplied to a feedback automatic cancel program 24 to determine the input γer to a feedback compensator 25 in step 7. According to this compensator input γer, the feedback compensator 25 computes the feedback control value δb in step 8. Then, according to the feedback control value δb and/or a manual switch input, a feedback manual cancel program 26 produces an output δrb in step 9.

Using the sum δr of the output δrb of the feedback manual cancel program 26 and the previously computed feedforward control value δrf as a command value, the rear wheel steering actuator control device 27 produces a control value Rr serving as a target value for the rear wheel steering angle in step 10.

Now the flow of the automatic feedback control cancel program 24 is described in the following.

Figure 5:
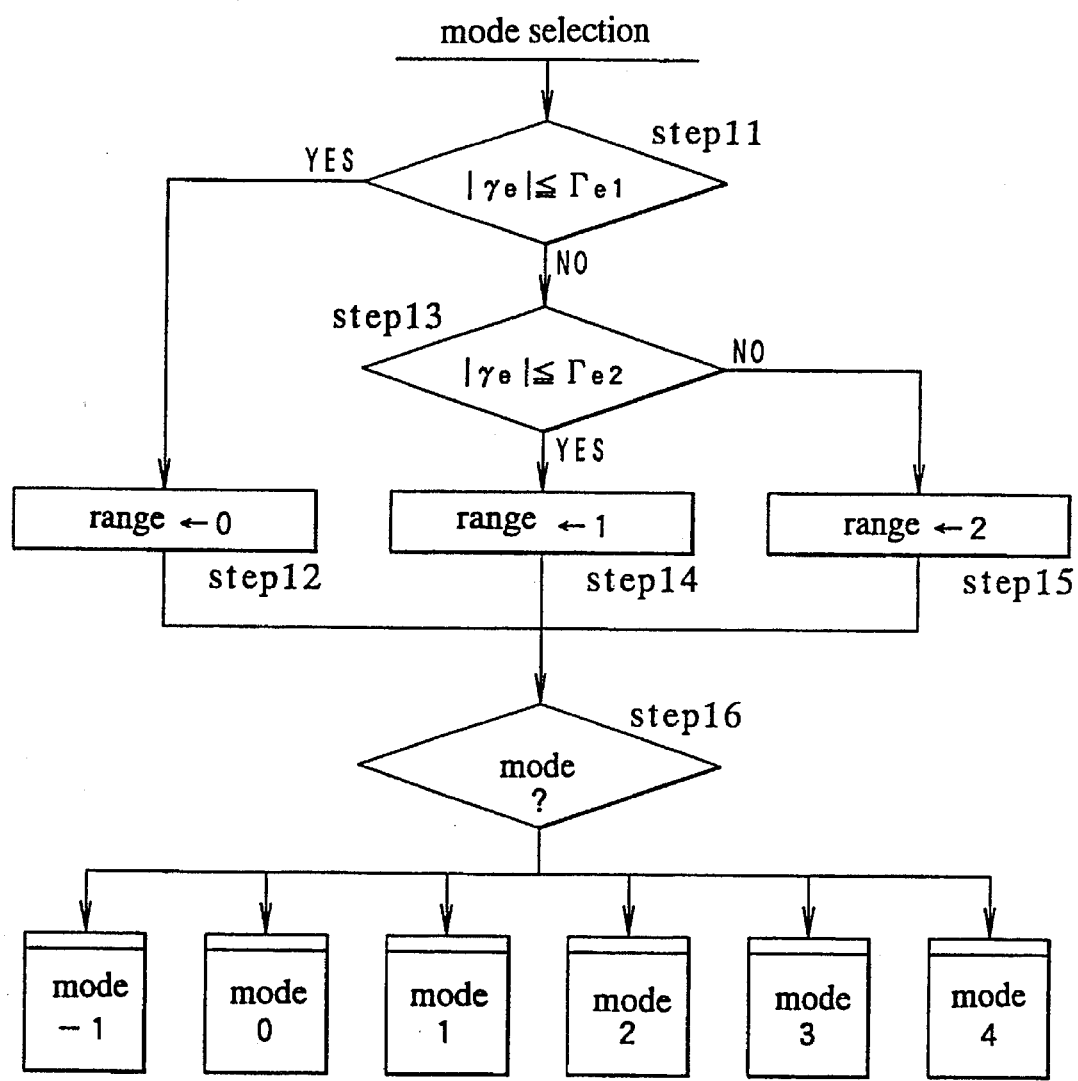
FIG. 5 is a flow chart showing the process of mode selection in the feedback control automatic cancel program.

First of all, in a mode selection flow illustrated in FIG. 5, the absolute value of the yaw rate deviation γe is compared with a first threshold value Γe1 in step 11. If this value is below the first threshold value Γe1, the yaw rate deviation γe is determined to be in range zero in step 12. If this value is above the first threshold value Γe1, the absolute value of the yaw rate deviation γe is then compared with a second threshold value Γe2 which is greater than the first threshold value Γe1 in step 13. If this value is determined to be below the second threshold value Γe2 or, in other words, in the region between the first threshold value Γe1 and the second threshold value Γe2, the yaw rate deviation γe is determined to be in range 1 in step 14. The region above the second threshold value Γe2 is defined as range 2 as shown in step 15.

Then, control modes are defined according to the current and preceding values of the yaw rate deviation as summarized in Table 1 given below.

TABLE 1

| | |
|---|---|
| mode −1 | feedback control cancel condition |
| mode zero | normal feedback condition |
| mode 1 | wait condition for transition from mode zero to mode 2 |
| mode 2 | feedback control value progressive decrease condition |
| mode 3 | wait condition for transition from mode −1 to mode 4 |
| mode 4 | feedback control value progressive increase condition |

Figure 6:
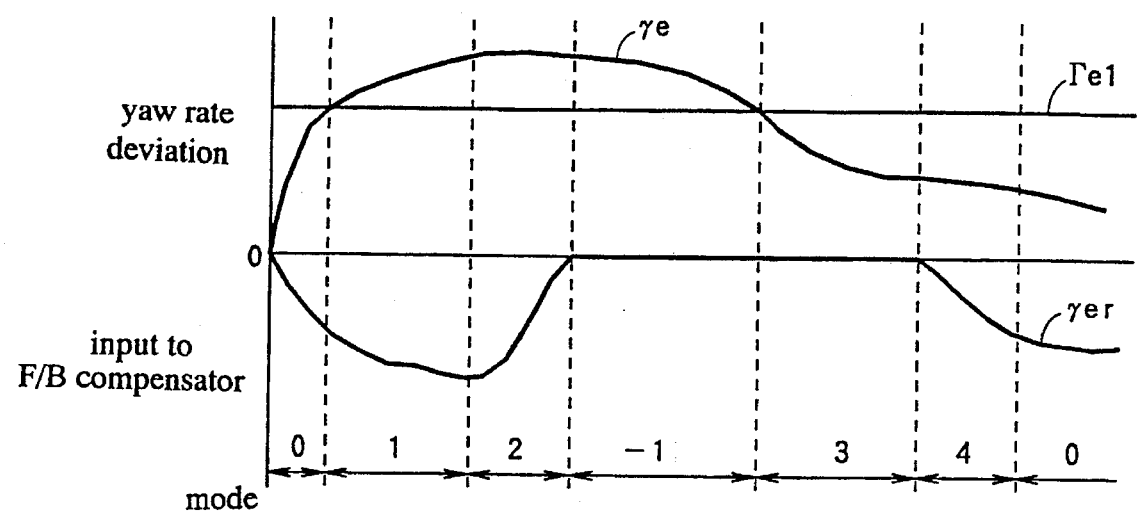
FIG. 6 is a graph showing the relationship between the actual yaw rate deviation γe and the input to the yaw rate compensator γer.

FIG. 6 shows an example of a history of change in the value of the yaw rate deviation, and the corresponding control modes. When the yaw rate deviation is within a certain threshold level (Γe1), and the yaw rate feedback control is being carried out in a normal fashion, this condition is defined as mode zero. When the yaw rate deviation exceeds this threshold level, the control system prepares for the feedback cancellation without taking any explicit action. This condition is defined as mode 1. If this condition persists for more than a prescribed time period, the system decides to cancel the yaw rate feedback control. Because an abrupt cancellation of the yaw rate feedback control may not be desirable as it may cause an unexpected abrupt change in the handling of the vehicle, the yaw rate feedback control is gradually or progressively diminished. This condition is defined as mode 2. The yaw rate feedback control is eventually entirely canceled, and this condition is defined as mode −1.

When the yaw rate deviation has again fallen below the threshold level, the control system prepares for the possible resumption of the yaw rate feedback control, and this condition is defined as mode 3. If the yaw rate deviation stays below the threshold level for more than a prescribed time period, the control system gradually or progressively resumes the yaw rate feedback control, and this condition is defined as mode 4. The yaw rate feedback control is eventually restored to its full force, and this means the restoration of the initial mode zero condition.

The mode selection as described above is carried out in step 16, and more detailed description of the control action is now described in the following with reference to the flow charts of FIGS. 7 to 12.

Figure 7:
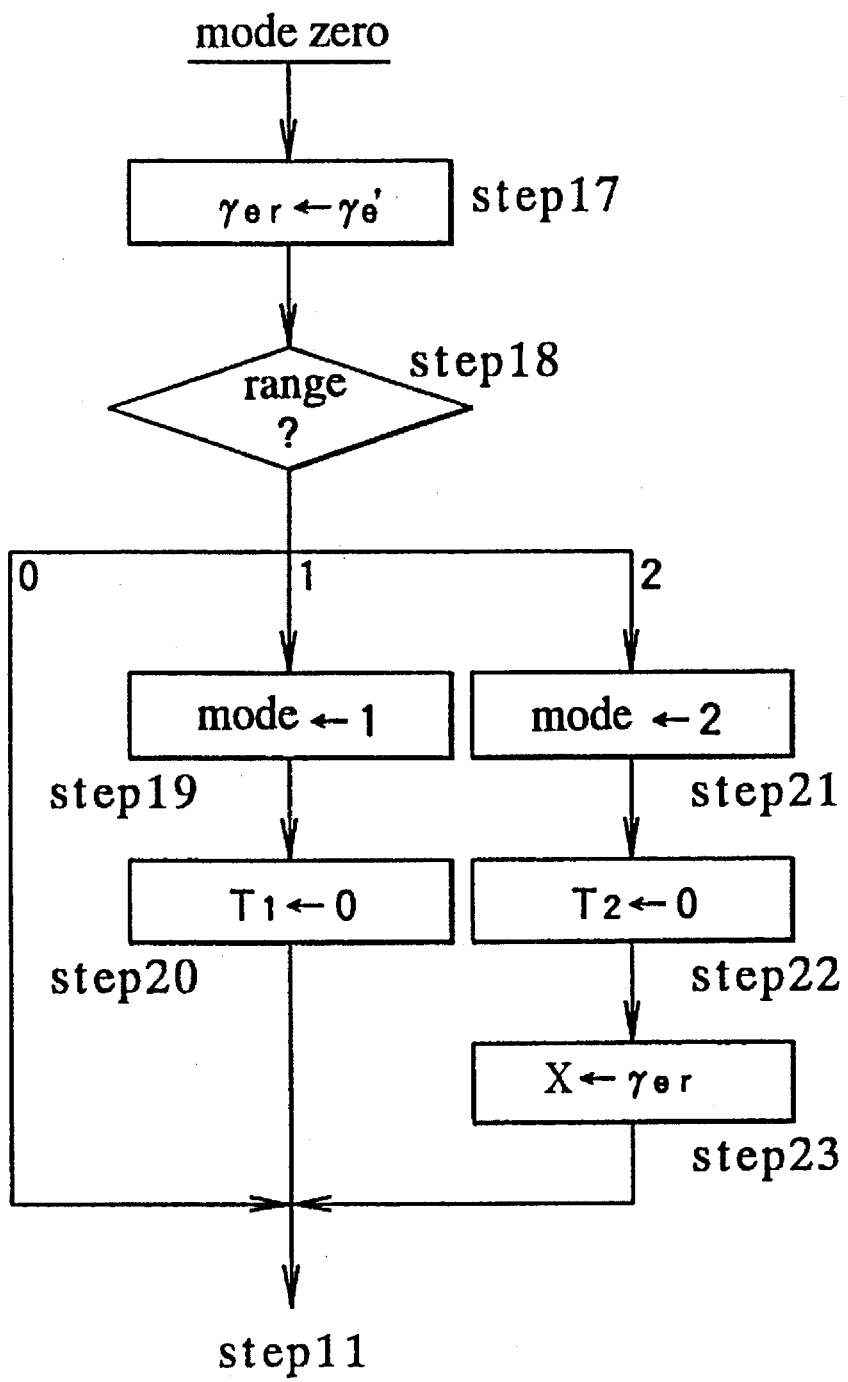
FIG. 7 is a flow chart showing the control process when mode zero is selected in the feedback control automatic cancel program.

If mode zero is current or the normal feedback control condition is current, as shown in FIG. 7, in step 17, the input γer to the feedback compensator 25 is set to the compensated yaw rate deviation γe' obtained in step 6 of the main flow, and the current yaw rate deviation range is evaluated in step 18. If range zero is current, or the yaw rate deviation is less than the first threshold value Γe1, the program flow returns to the mode selection flow given in FIG. 5. If range 1 is current, or the yaw rate deviation is between the first and second threshold values Γe1 and Γe2, the mode is set to 1 in step 19, and a wait timer T1 is reset in step 20 before the program flow returns to the mode selection flow. If range 2 is current, or the yaw rate deviation is above the second threshold value Γe2, the mode is set to 2 in step 21, and a progressive decrease timer T2 is reset in step 22 and the current input γer to the feedback compensator 25 is substituted into an initial value X in step 23 before the program flow returns to the mode selection flow.

Figure 8:
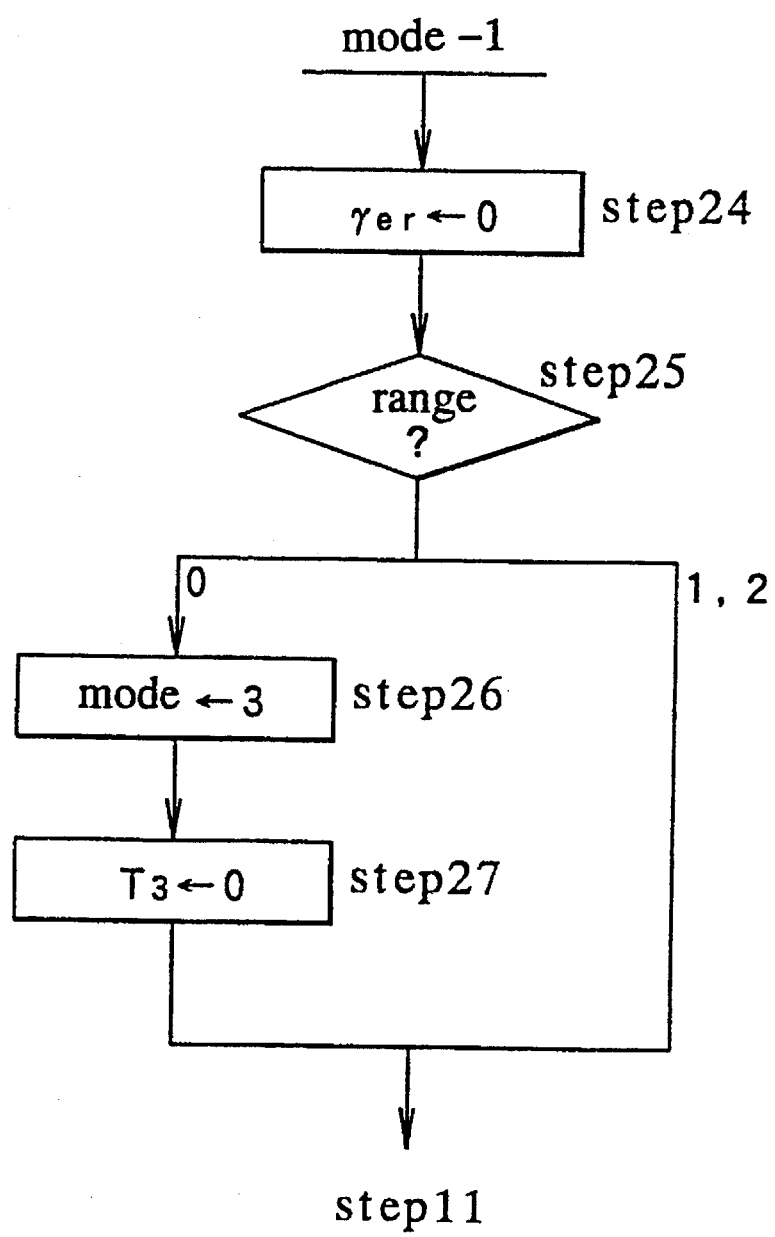
FIG. 8 is a flow chart showing the control process when mode −1 is selected in the feedback control automatic cancel program.

If mode −1 is current, or the feedback control cancel condition is current, as shown in FIG. 8, the input γer to the feedback compensator 25 is set to zero in step 24, and the current yaw rate deviation range is evaluated in step 25. If range 1 or 2 is current, the program flow returns to the mode selection flow. If range zero is current, mode 3 is selected in step 26, and a wait timer T3 is reset in step 27 before the program flow returns to the mode selection flow.

Figure 9:
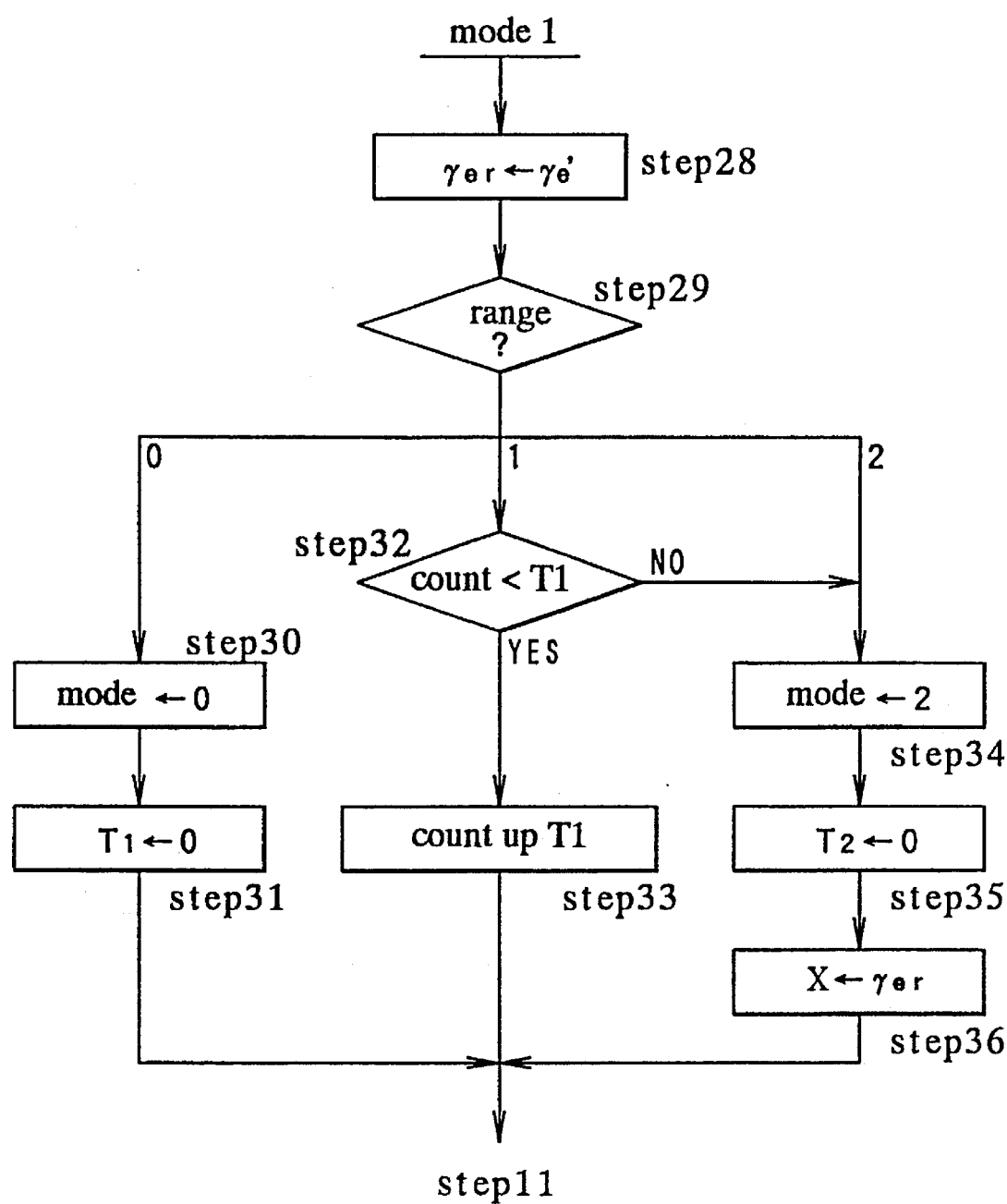
FIG. 9 is a flow chart showing the control process when mode 1 is selected in the feedback control automatic cancel program.

If mode 1 is current or the wait condition for the transition from mode zero to mode 2 is current, as shown in FIG. 9, the input γer to the feedback compensator 25 is set to the compensated yaw rate deviation γe' obtained in step 6 of the main flow in step 28, and the current yaw rate deviation range is evaluated in step 29. If range zero is current, mode zero is selected in step 30 and the wait timer T1 is reset before the program flow returns to the mode selection flow. If range 1 is current, it is determined if the wait timer T1 has timed up or not in step 32. If the wait timer T1 has not timed up, the elapsed time is counted up in step 33 before the program flow returns to the mode selection flow. If range 2 is current or if the timer T1 is determined to have timed up in step 32, mode 2 is selected in step 34, the progressive decrease timer T2 is reset in step 35, an initial value X is set as the current value of the input γer to the feedback compensator 25 in step 36 before the program flow returns to the mode selection flow.

Figure 10:
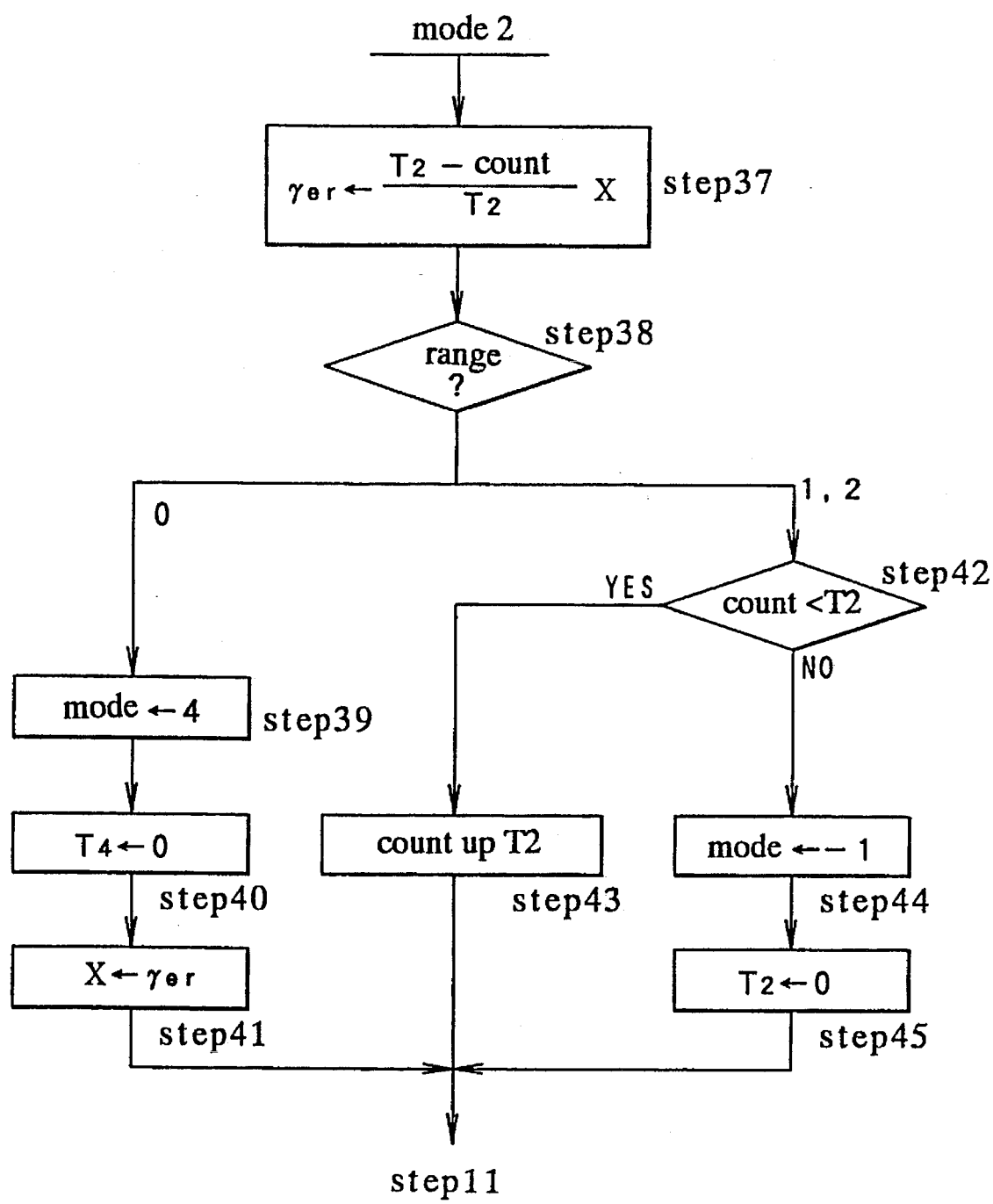
FIG. 10 is a flow chart showing the control process when mode 2 is selected in the feedback control automatic cancel program.

If mode 2 is current or the feedback control value progressive decrease condition is current, as shown in FIG. 10, the input γer to the feedback compensator 25 is replaced with a value which progressively diminishes with time in step 37, and the current yaw rate deviation range is determined in step 38. If range zero is current, mode 4 is selected in step 39, a progressive decrease timer T4 is reset in step 40, and an initial value X is set as the current value of the input γer to the feedback compensator 25 in step 41 before the program flow returns to the mode selection flow. If range 1 or 2 is current in step 38, it is determined if the progressive decrease timer T2 has timed up or not in step 42. If the progressive decrease timer T2 is yet to time up, the elapsed time is counted up in step 43 before the program flow returns to the mode selection flow. If the timer has timed up in step 42, mode −1 is selected in step 44 and the progressive decrease timer T2 is reset in step 45 before the program flow returns to the mode selection flow.

Figure 11:
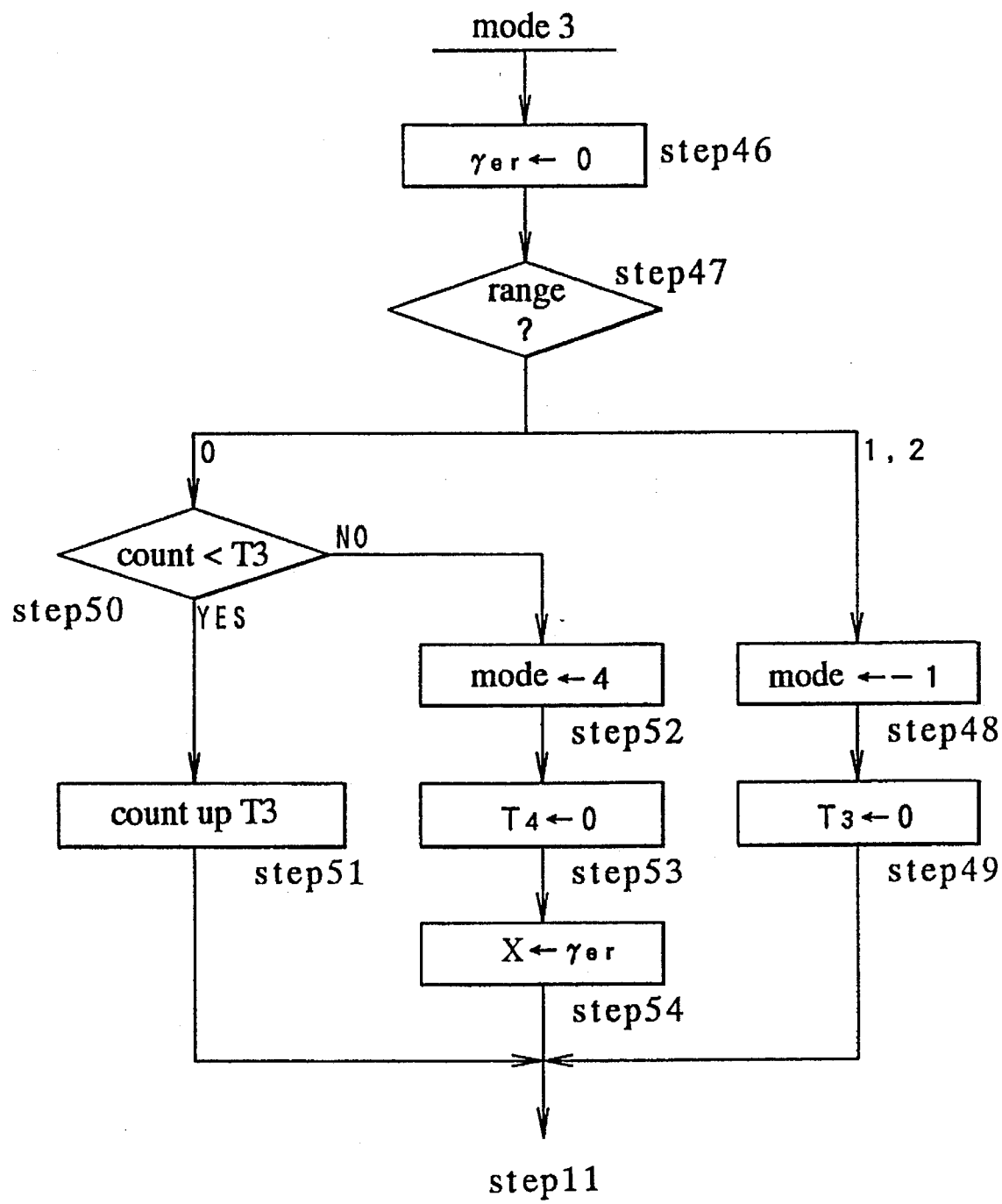
FIG. 11 is a flow chart showing the control process when mode 3 is selected in the feedback control automatic cancel program.

If mode 3 is current or the wait condition for the transition from mode −1 to mode 4 is current, as shown in FIG. 11, the input γer to the feedback compensator 25 is set to zero in step 46, and the current yaw rate deviation range is evaluated in step 47. If range 1 or 2 is current, mode −1 is selected in step 48 and the wait timer T3 is reset in step 49 before the program flow returns to the mode selection flow. If range zero is current, it is determined if the wait timer T3 has timed up or not in step 50. If the wait timer T3 has not timed up, the elapsed time is counted up in step 51 before the program flow returns to the mode selection flow. If the timer is determined to have timed up in step 50, mode 4 is selected in step 52, the progressive decrease timer T4 is reset in step 53, the current input γer is substituted into an initial value X for the feedback compensator 25 in step 54 before the program flow returns to the mode selection flow.

Figure 12:
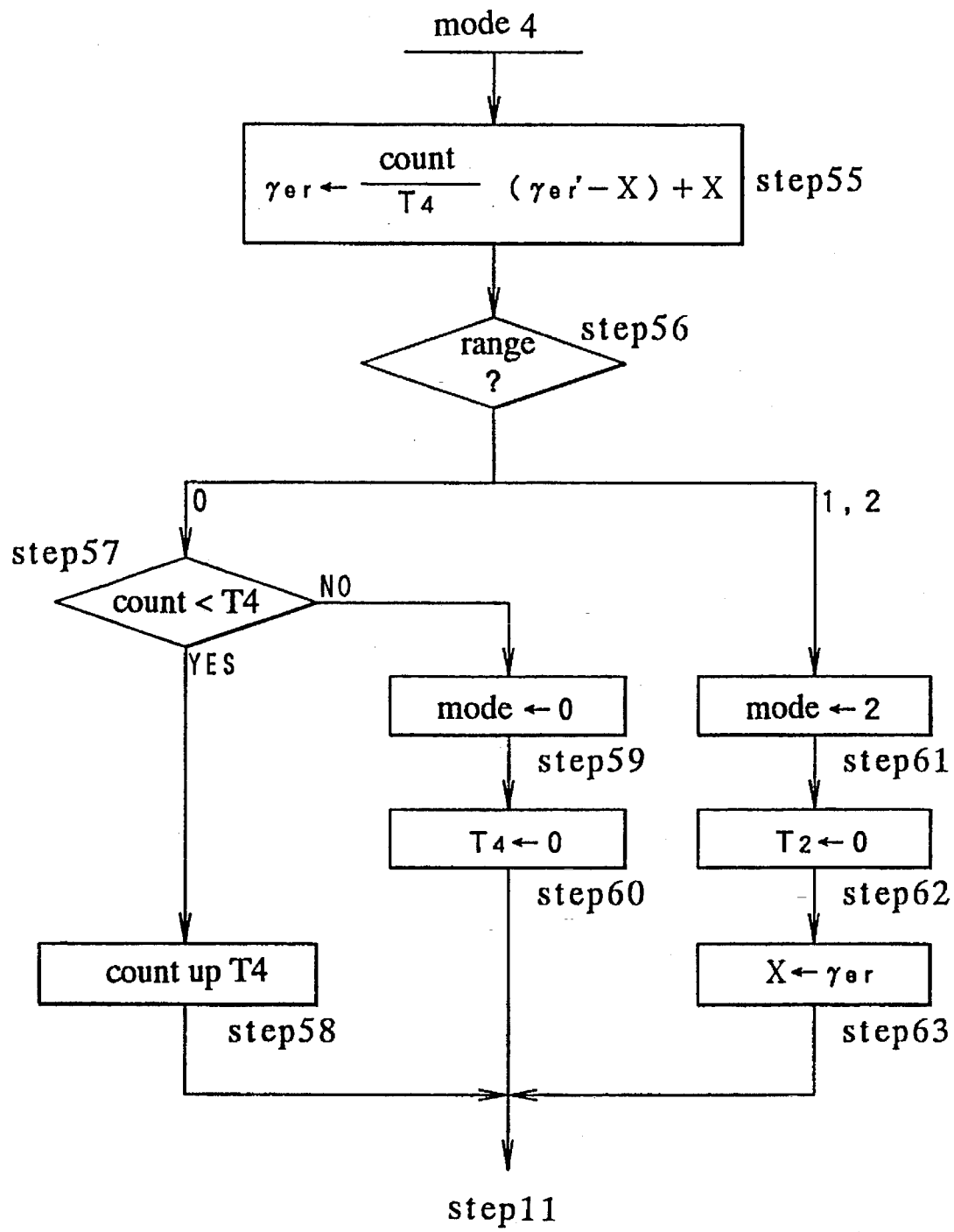
FIG. 12 is a flow chart showing the control process when mode 4 is selected in the feedback control automatic cancel program.

If mode 4 is current or the feedback control value progressive increase condition is current, as shown in FIG. 12, the input γer to the feedback compensator 25 is replaced with a value which progressively increases with time in step 55, and the current yaw rate deviation range is determined in step 56. If range zero is current, it is determined if the progressive increase timer T4 has timed up or not in step 57. If the progressive decrease timer T4 is yet to time up, the elapsed time is counted up in step 58 before the program flow returns to the mode selection flow. If the timer has timed up in step 57, mode zero is selected in step 59 and the progressive decrease timer T4 is reset in step 60 before the program flow returns to the mode selection flow. If range 1 or 2 is detected in step 56, mode 2 is selected in step 61, the progressive decrease timer T2 is reset in step 62, the current value of the input γer is substituted into an initial value X for the feedback compensator 25 in step 63 before the program flow returns to the mode selection flow.

Now the operation of the above described control process is described in the following by taking specific examples of transition of conditions.

Figure 13:
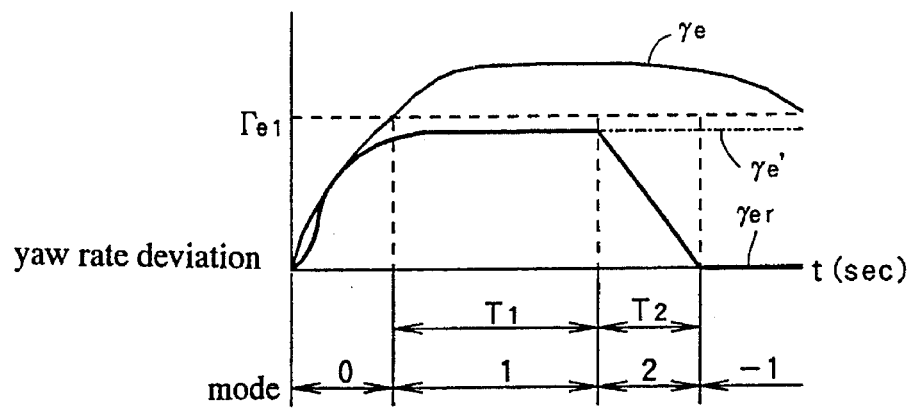
FIG. 13 is a graph showing the change in the input to the yaw rate compensator γer when the yaw rate deviation has continued to exceed a prescribed value for more than a prescribed time period.

When the yaw rate deviation γe continues to exceed the first threshold value Γe1 (range 1) for a time period T1 during the normal feedback control condition ( mode zero ) as shown in FIG. 13, the input to the feedback compensator 25 is progressively diminished over a time period T2 ( mode 2 ), and, eventually, the feedback control cancel condition (mode −1) is produced.

Figure 14:
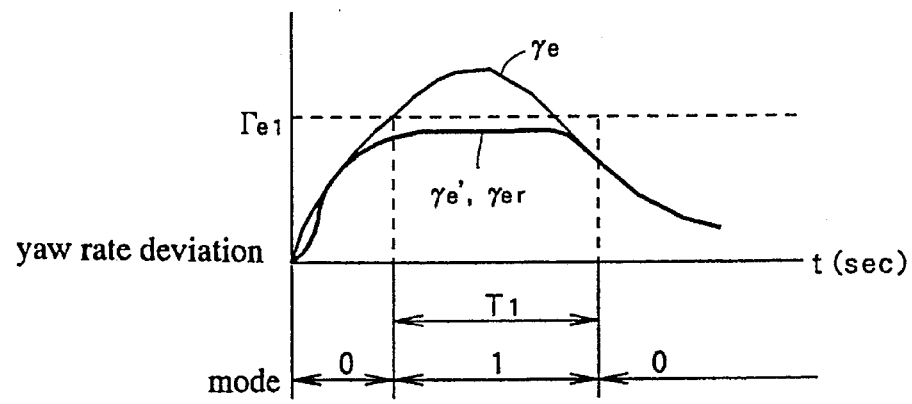
FIG. 14 is a graph showing the change in the input to the yaw rate compensator γer when the yaw rate deviation has exceeded the prescribed value but has fell below the prescribed value within the prescribed time period.

As shown in FIG. 14, if the yaw rate deviation γe exceeds the first threshold value Γe1 (range 1) during the normal feedback control condition (mode zero), and before this condition lasts a time period T1 the yaw rate deviation γe returns to a level below the first threshold value Γe1, then, the normal feedback control condition (mode zero) is maintained without making any changes to the control mode.

Figure 15:
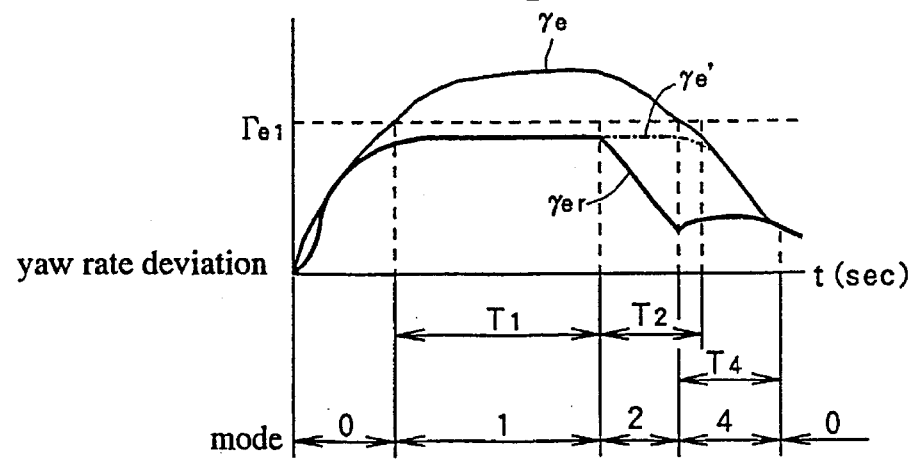
FIG. 15 is a graph showing the change in the input to the yaw rate compensator γer when the yaw rate deviation has fell below the prescribed value during the control process of FIG. 13.

As shown in FIG. 15, if the yaw rate deviation γe continues to exceed the first threshold value Γe1 (range 1) for more than a time period T1 during the normal feedback control condition (mode zero), the input to the feedback compensator 25 is started to be progressively diminished. However, if the yaw rate deviation γe falls back below the first threshold value Γe1 during this process (within the time period T2), from this time on, the normal feedback control condition (mode zero) is restored over a time period T4.

Figure 16:
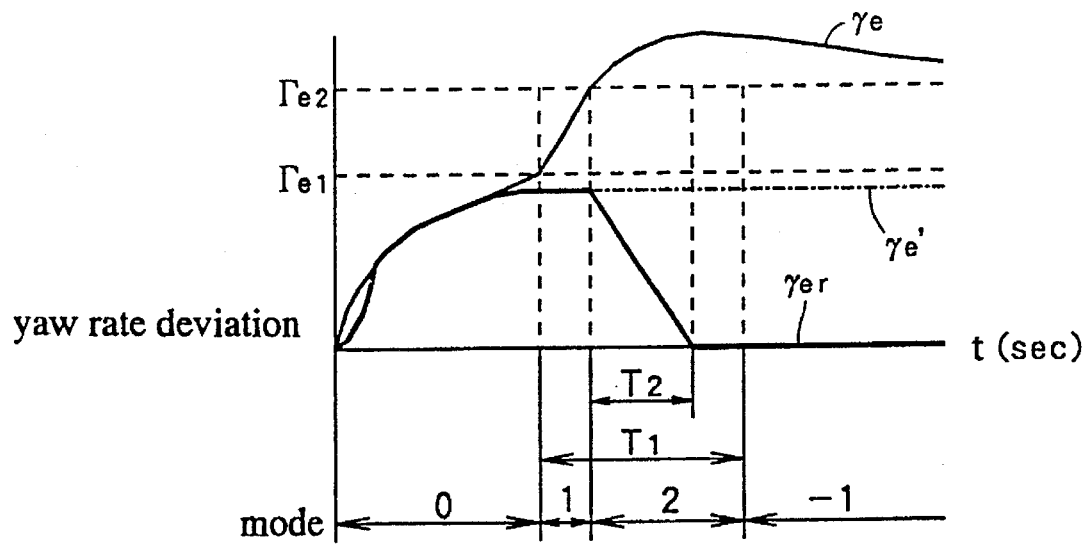
FIG. 16 is a graph showing the change in the input to the yaw rate compensator γer when the yaw rate deviation has exceeded the first prescribed value, and then exceeded a second prescribed value.

As shown in FIG. 16, if the yaw rate deviation γe exceeds the first threshold value Γe1 at a time point during the normal feedback condition (mode zero) and, before elapsing of the time period T1 from this time point, exceeds the second threshold value Γe2, then, the input γer to the feedback compensator 25 is progressively diminished over the time period T2 (mode 2). Ultimately, the feedback control cancel condition (mode −1) is produced. In other words, if the yaw rate deviation becomes significantly great, the yaw rate feedback control is immediately canceled without waiting for the elapsing of the time period T1. However, this cancellation action is carried out in a gradual manner to avoid any abrupt change in the handling of the vehicle.

Figure 17:
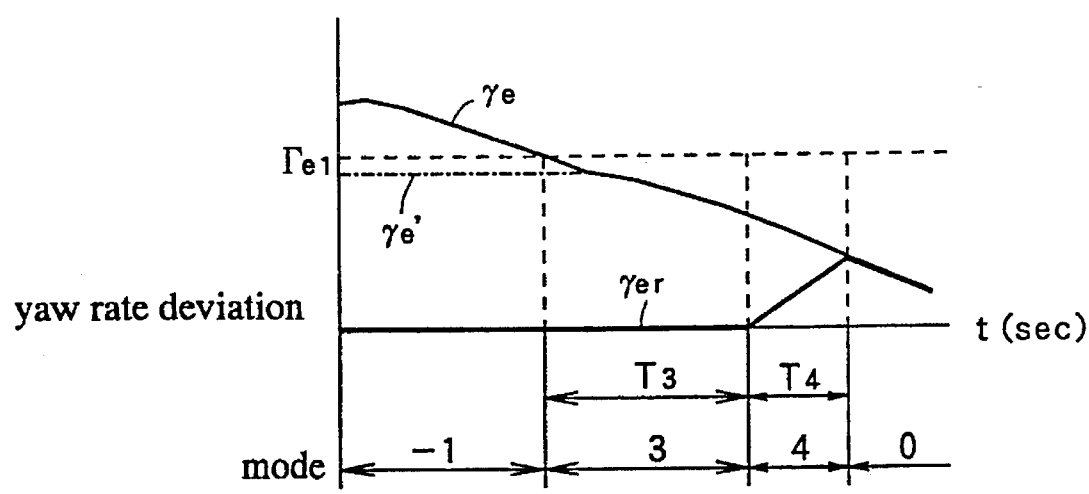
FIG. 17 is a graph showing the change in the input to the yaw rate compensator γer when the yaw rate deviation was above the prescribed value but has since gradually fell below the prescribed value.

As shown in FIG. 17, if the yaw rate deviation γe continues to fall below the first threshold value Γe1 for more than a time period T3 during the feedback control cancel condition (mode −1), the mode 3 condition is produced, and the input γer to the feedback compensator 25 is progressively diminished over the time period T4 (mode 4). Ultimately, the normal feedback control condition (mode zero) is produced.

Figure 18:
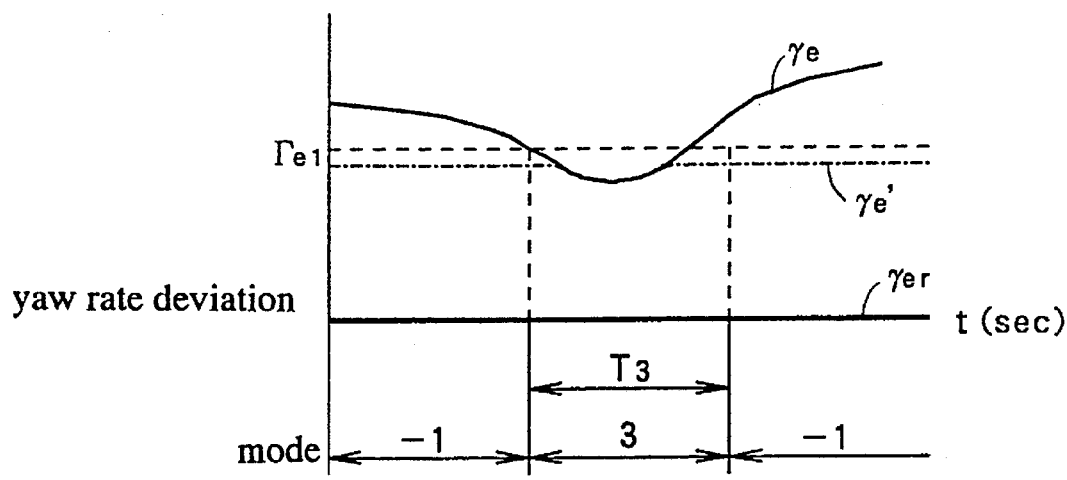
FIG. 18 is a graph showing the change in the input to the yaw rate compensator γer when the yaw rate deviation was above the prescribed value, but has since gradually fell below the prescribed value, and then again increased above the prescribed value within the prescribed time period.

As shown in FIG. 18, if the yaw rate deviation γe falls below the first threshold value Γe1 at a time point during the feedback control cancel condition (mode −1), and, before elapsing of the time period T3 from this time point, increases above the first threshold value Γe1,, then, the feedback cancel condition ( mode −1) is maintained.

Figure 19:
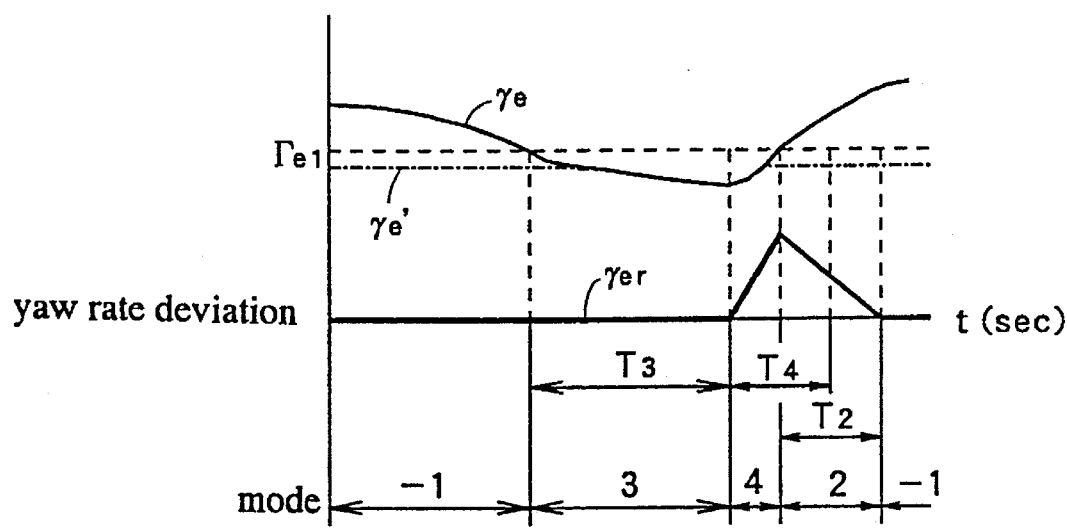
FIG. 19 is a graph showing the change in the input to the yaw rate compensator γer when the yaw rate deviation was above the prescribed value, but has since gradually fell below the prescribed value, and then again increased above the prescribed value after the elapsing of the prescribed time period.

As shown in FIG. 19, if the yaw rate deviation γe continues to fall below the first threshold value Γe1 for more than the time period T3 (mode 3) during the feedback cancel condition (mode −1), and then increases above the first threshold valve Γe1 during the subsequent process of progressively increasing the input γer to the feedback compensator 25 (mode 4) before elapsing of the time period T4, the input γer to the feedback compensator 25 is progressively diminished from this time point on over the time period T2 (mode 1). Ultimately, the feedback cancel condition (mode −1) is produced.

Now the manual cancel program is described in the following. First of all, control modes are defined according to the current and previous conditions of a manual switch for canceling the yaw rate feedback control as summarized in Table 2 given below.

TABLE 2

| | |
|---|---|
| mode zero | normal feedback control condition |
| mode 1 | feedback control cancel condition |
| mode 2 | feedback control value progressive decrease condition |
| mode 3 | feedback control value progressive increase condition |

Figure 20:
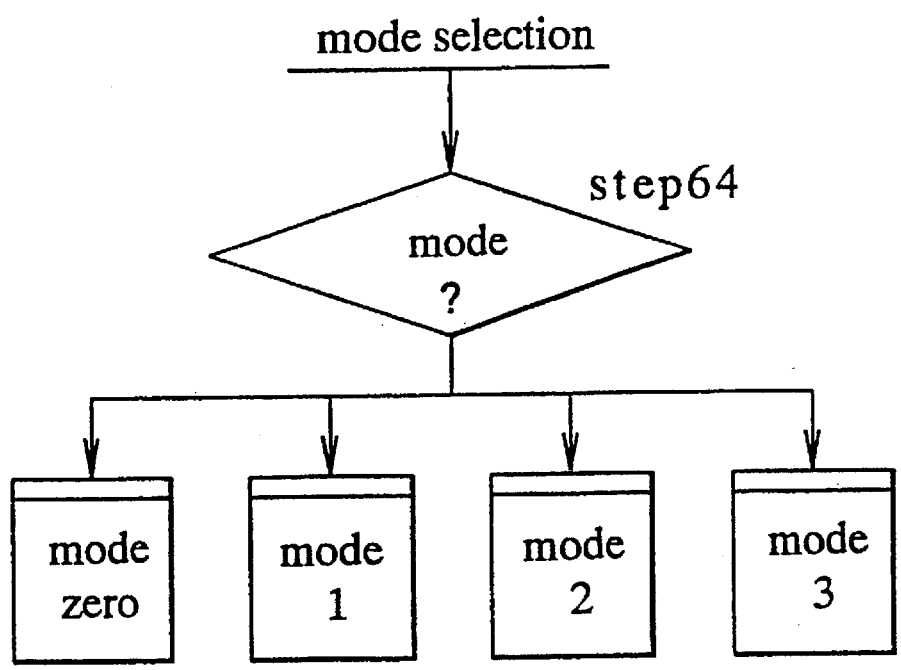
FIG. 20 is a flow chart showing the process of mode selection in the feedback control manual cancel program.

Mode selection is carded out according to this definition in step 64 as illustrated in FIG. 20.

Figure 21:
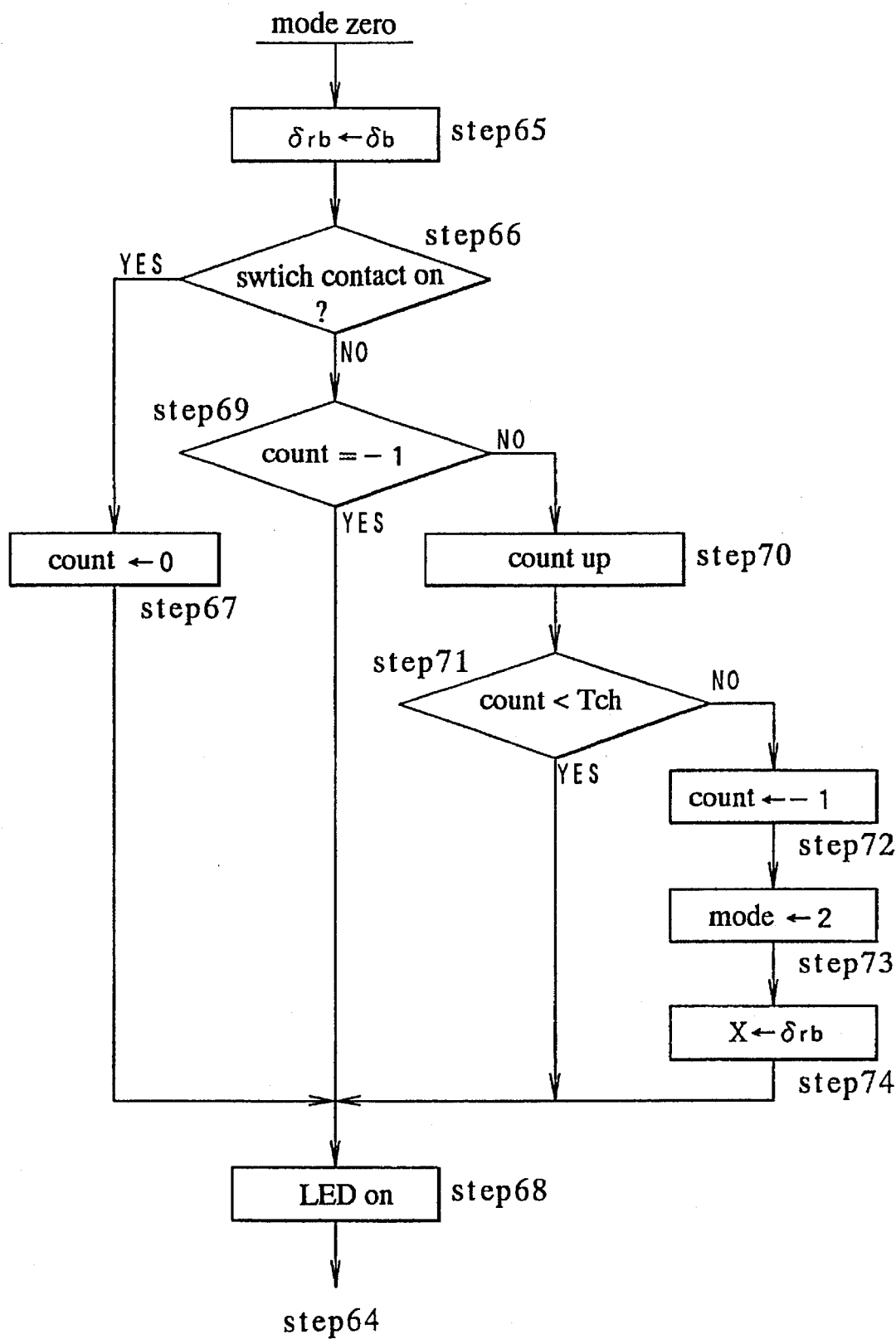
FIG. 21 is a flow chart showing the control process when mode zero is selected in the feedback control manual cancel program.

If mode zero is current or the normal feedback condition is current, then, as show in FIG. 21, the feedback output δrb is simply set as the output δb of the feedback compensator 25 in step 65, and the output of the manual cancel switch is evaluated in step 66. If the normal contact is on, or the manual cancel switch is not pressed, a counter for suppressing chattering is reset in step 67, and the indicator lamp is lighted up in step 68 before the program flow returns to the mode selection flow.

If the normal contact is not on or if it is detected that the manual cancel switch has been pushed in step 66, it is evaluated in step 66 if a count complete flag has been set up. If the count complete flag has already been set up in step 69, the program flow simply advances to step 68 because it means that the desired cancellation operation has already been initiated as described hereinafter. On the other hand, if the count flag has not yet been set up in step 69, the chattering prevention time Tch is counted up in step 70. This counting up process is continued until it is determined in step 71 that the counter has been fully counted up to Tch. When it is thus determined that the chattering preventing time has elapsed and that the yaw rate feedback control manual cancel switch has indeed been pressed, the count complete flag is set up in step 72, and mode 2 is selected in step 73. Then, the output δrb of the feedback manual cancel program 26 at this point is set to an initial value X in step 74, and the program flow advances to step 68.

Figure 22:
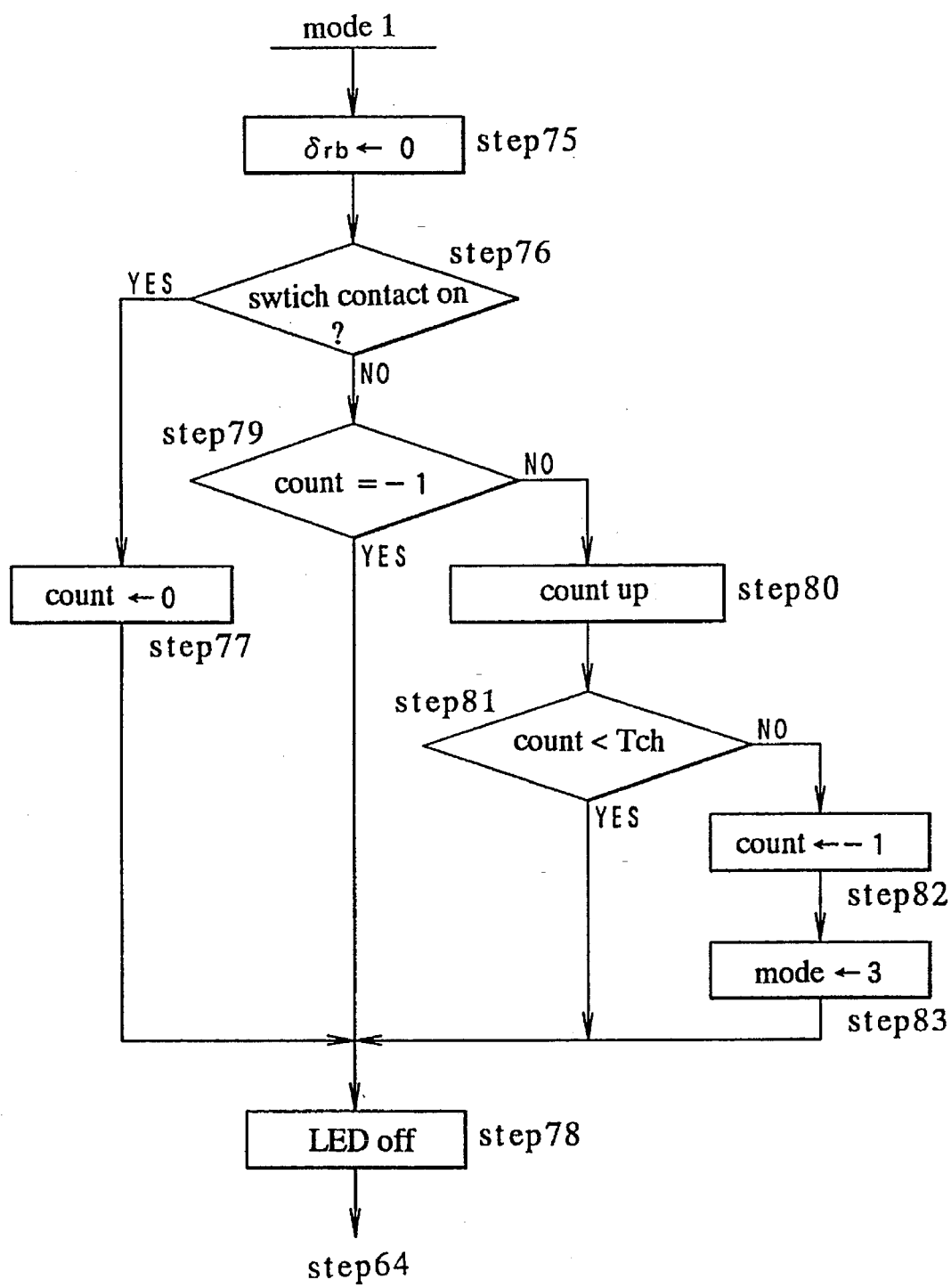
FIG. 22 is a flow chart showing the control process when mode 1 is selected in the feedback control manual cancel program.
Figure 23:
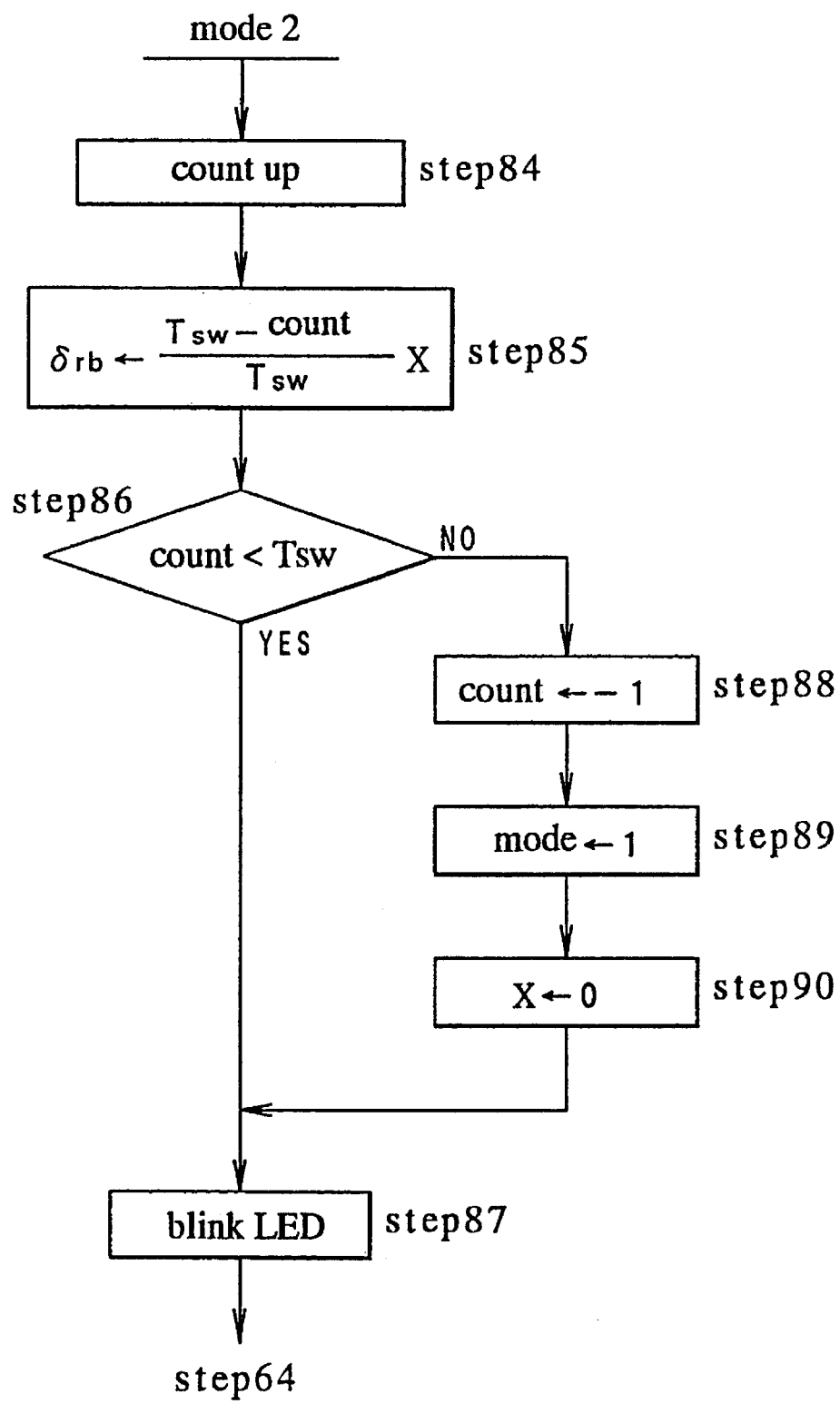
FIG. 23 is a flow chart showing the control process when mode 2 is selected in the feedback control manual cancel program.

If mode 1 is current or if the feedback control cancel condition is current, as shown in FIG. 22, the feedback control automatic cancel program output δrb is set to zero in step 75, and the output of the manual cancel switch is evaluated in step 76. If the cancel contact is on, the counter for preventing chattering is reset in step 77 and the indicator is turned off in step 78 before the program flow returns to the mode selection flow.

If the cancel contact is not on or the manual cancel switch is selected, it is determined if the count complete flag has been set up or not in step 79. If the count complete flag has not been set up in step 79, the counter is counted up until the chattering prevention time Tch is reached in step 80. If the count is not complete, the program flow advances to step 78. Thus, the count is continued until the count is determined to be complete in step 81 and the count complete flag is then set up in step 82. At the same time, mode 3 is selected in step 83 before the program flow advances to step 78.

If mode 2 is current, a progressive decrease timer Tsw is counted up in step 84, and the feedback control manual cancel program output δrb is renewed to a value corresponding to the elapsed time in step 85. Then, the remaining time on the progressive decrease timer Tsw is evaluated in step 86. If the time is not yet up, the indicator lamp is blinked in step 87, and the program flow returns to the mode selection flow. On the other hand, if the progressive decrease timer Tsw has timed up, the count complete flag is set up in step 88, mode 1 is selected in step 89, and the initial value of the feedback control manual cancel program output δrb is set as zero in step 90 before the program flow advances to step 87.

Figure 24:
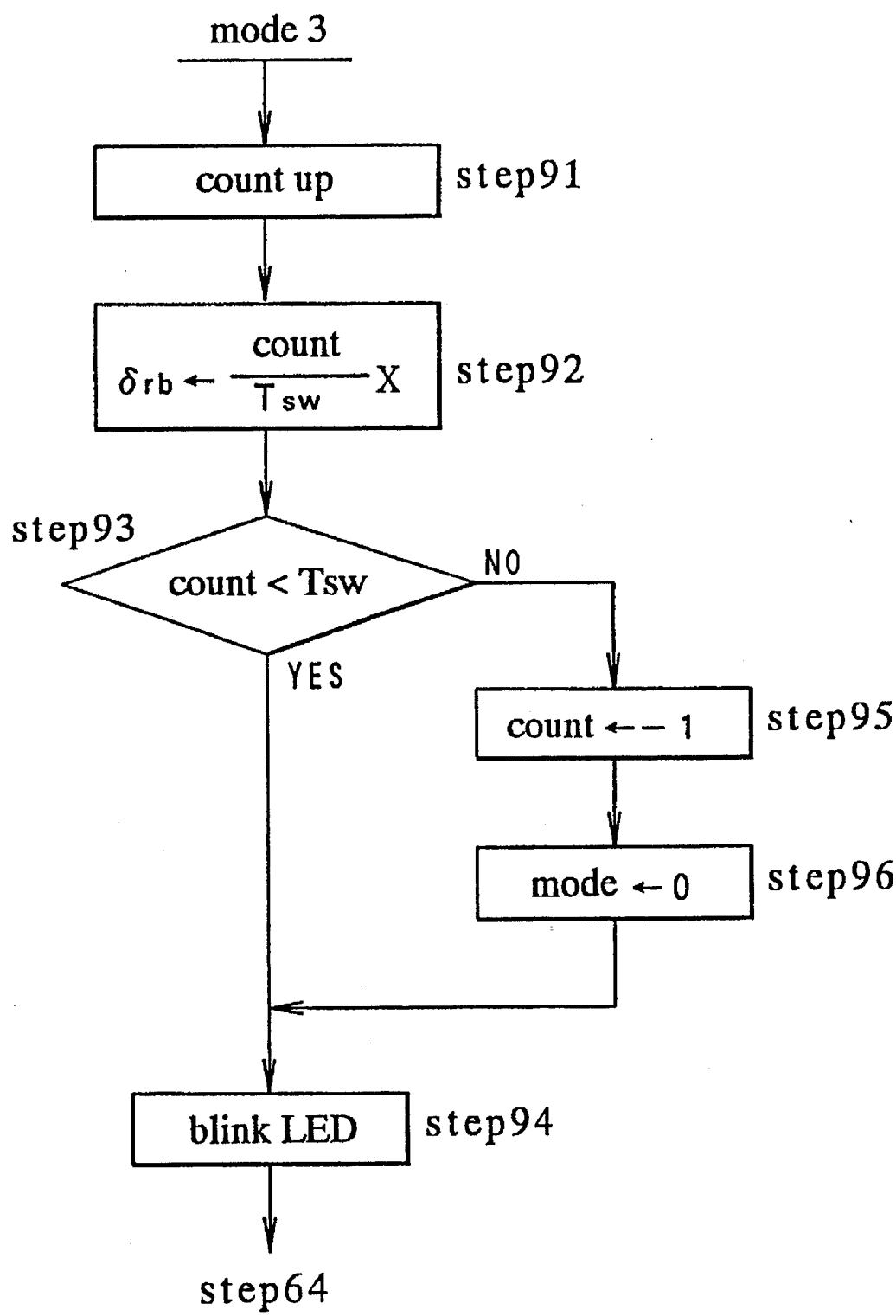
FIG. 24 is a flow chart showing the control process when mode 3 is selected in the feedback control manual cancel program.

If mode 3 is current, as shown in FIG. 24, the progressive increase timer is counted up in step 91, and the feedback control manual cancel program output δrb is renewed to a value corresponding to the elapsed time in step 92. Then, the remaining time on the progressive increase timer Tsw is evaluated in step 93. If the time is not yet up, the indicator lamp is blinked in step 94, and the program flow returns to the mode selection flow. On the other hand, if the progressive increase timer Tsw has timed up, the count complete flag is set up in step 95, mode zero is selected in step 96 before the program flow advances to step 94.

Thus, according to the present invention, even when the gripping limit of the vehicle tires has been reached on a low frictional coefficient road surface such as a gravel road surface and an icy road surface, when the limit of the feedback control has been otherwise exceeded, or when the response limit of the rear wheel steering actuator has been exceeded for instance due to continued sudden and large angle steering maneuvers while driving on a winding road, depending on the magnitude of the deviation between the standard yaw rate and the actual yaw rate, the yaw rate feedback control is automatically canceled, and the possible interference or conflict between the vehicle response and the maneuvering effort of the vehicle operator can be avoided. As an additional advantage, in case of a failure to accurately detect the yaw rate of the vehicle, for instance due to a failure of a yaw rate sensor, or in case of a failure to accurately compute the standard yaw rate, because it would give rise to a relatively large yaw rate deviation, the yaw rate feedback control would be automatically canceled, and the automatic canceling of the yaw rate feedback control may serve as a fail-safe measure for the yaw rate feedback control system.

Furthermore, by taking advantage of the possibility of the manual cancellation of the yaw rate feedback control, it is possible for the vehicle operator to operate the vehicle intentionally under extreme conditions such as those suitable for sports event driving and driving under extreme road conditions.

Although the present invention has been described in terms of a specific embodiment, it is possible to modify and alter details thereof without departing from the spirit of the present invention.

What we claim is:

1. A control system for a front and rear wheel steering vehicle, comprising:
    steerable front road wheels steerable by a steering wheel via a front wheel steering device;
    steerable rear road wheels steerable by a rear wheel steering actuator;
    standard yaw rate computing means for determining a standard yaw rate according to operating conditions of said vehicle including a steering angle of said steering wheel;
    yaw rate detecting means for detecting an actual yaw rate of said vehicle;
    feedback control means for controlling said rear wheel steering actuator according to a deviation of said actual yaw rate from said standard yaw rate; and
    cancelling means for cancelling operation of said feedback control means.

2. A control system for a front and rear wheel steering vehicle according to claim 1, further comprising feedforward means for controlling said rear wheel steering actuator according to an input to said steering wheel.

3. A control system for a front and rear wheel steering vehicle according to claim 2, wherein said canceling means comprises a manual switch.

4. A control system for a front and rear wheel steering vehicle according to claim 1, wherein said canceling means comprises a manual switch.

5. A control system for a front and rear wheel steering vehicle according to claim 1, wherein the steerable road wheels are steerable by a driver independently of the feedback control means when the operation of the feedback control means is cancelled by said cancelling means.

6. A control system for a front and rear wheel steering vehicle, comprising:
    steerable front road wheels steerable by a steering wheel via a front wheel steering device;
    steerable rear road wheels steerable by a rear wheel steering actuator;
    standard yaw rate computing means for determining a standard yaw rate according to operating conditions of said vehicle including a steering angle of said steering wheel;
    yaw rate detecting means for detecting an actual yaw rate of said vehicle;
    feedback control means for controlling said rear wheel steering actuator according to a deviation of said actual yaw rate from said standard yaw rate;
    cancelling means for cancelling operation of said feedback control means;
    said cancelling means comprising a manual switch; and
    said cancelling means further comprising means for allowing a cancelling operation by said cancelling means to be effected gradually.

7. A control system for a front and rear wheel steering vehicle, comprising:
    steerable front road wheels steerable by a steering wheel via a front wheel steering device;
    steerable rear road wheels steerable by a rear wheel steering actuator;
    standard yaw rate computing means for determining a standard yaw rate according to operating conditions of said vehicle including a steering angle of said steering wheel;
    yaw rate detecting means for detecting an actual yaw rate of said vehicle;
    feedback control means for controlling said rear wheel steering actuator according to a deviation of said actual yaw rate from said standard yaw rate;
    cancelling means for cancelling operation of said feedback control means; and
    said cancelling means effects a cancelling operation according to a result of comparison between said deviation of said actual yaw rate from said standard yaw rate and a first threshold level.

8. A control system for a front and rear wheel steering vehicle according to claim 7, wherein said canceling means effects said canceling operation when said yaw rate deviation has continued to exceed said first threshold level for more than a certain time period.

9. A control system for a front and rear wheel steering vehicle according to claim 8, wherein said canceling means further comprises means for allowing said canceling operation by said canceling means to be effected gradually.

10. A control system for a front and rear wheel steering vehicle according to claim 9, wherein said canceling means effects said canceling operation immediately when said yaw rate deviation has exceeded a second threshold level which is higher than said first threshold level.

11. A control system for a front and rear wheel steering vehicle according to claim 10, wherein said cancelling means restores the operation of said feedback control means when said yaw rate deviation has continued to stay below a third threshold level for a certain period of time, said third threshold level is intermediate said first and second threshold levels.

12. A control system for a front and rear wheel steering vehicle according to claim 11, wherein said canceling means restores the operation of said feedback control means gradually.

13. A control system for a front and rear wheel steering vehicle, comprising:
    steerable front road wheels steerable by a steering wheel via a front rear wheel steering device;
    steerable rear road wheels steerable by a rear wheel steering actuator;
    standard yaw rate computing means for determining a standard yaw rate according to operating conditions of said vehicle including a steering angle of said steering wheel;
    yaw rate detecting means for detecting an actual yaw rate of said vehicle;
    feedback control means for controlling said rear wheel steering actuator according to a deviation of said actual yaw rate from said standard yaw rate;
    cancelling means for cancelling operation of said feedback control means;
    feedforward means for controlling said rear wheel steering actuator according to an input to said steering wheel;
    said cancelling means comprising a manual switch; and
    said cancelling means further comprising means for allowing a cancelling operation by said cancelling means to be effected gradually.

14. A control system for a front and rear wheel steering vehicle, comprising;
   steerable front road wheels steerable by a steering wheel via a front wheel steering device;
   steerable rear wheels steerable by a rear wheel actuator;
   standard yaw rate computing means for determining a standard yaw rate according to operating conditions of said vehicle including a steering angle of said steering wheel;
   yaw rate detecting means for detecting an actual yaw rate of said vehicle;
   feedback control means for controlling said rear wheel steering actuator according to a deviation of said actual yaw rate from said standard yaw rate;
   cancelling means for cancelling operation of said feedback control means;
   feedforward means for controlling said rear wheels steering actuator according to an input to said steering wheel; and
   said cancelling means effects a cancelling operation according to a result of comparison between said deviation of said actual yaw rate from said standard yaw rate and a first threshold level.

15. A control system for a front and rear steering vehicle according to claim 14, wherein said canceling means restores the operation of said feedback control means when said yaw rate deviation has continued to stay below a third threshold level for a certain period of time, said third threshold level is intermediate said first and second threshold levels.

16. A control system for a front and rear wheel steering vehicle according to claim 15, wherein said canceling means further comprises means for allowing said canceling operation by said canceling means to be effected gradually.

17. A control system for a front and rear wheel steering vehicle according to claim 16, wherein said canceling means effects said canceling operation immediately when said yaw rate deviation has exceeded a second threshold level which is higher than said first threshold level.

18. A control system for a front and rear wheel steering vehicle according to claim 17, wherein said canceling means restores the operation of said feedback control means when said yaw rate deviation has continued to stay below a third threshold level for a certain time period.

19. A control system for a front and rear wheel steering vehicle according to claim 18, wherein said canceling means restores the operation of said feedback control means gradually.

* * * * *

UNITED STATES PATENT AND TRADEMARK OFFICE
CERTIFICATE OF CORRECTION

PATENT NO. : 5,576,957
DATED : November 19, 1996
INVENTOR(S) : Nobuyoshi Asanuma, Kiyoshi Wakamatsu, Manabu Ikegaya It is certified that error appears in the above-indentified patent and that said Letters Patent is hereby corrected as shown below:

On the cover page, correct the Primary Examiner's last name from "Tesh" to --Teska--.
Column 1, line numbered between 39 and 40, change "clue" to --due--;
    line 61, change "Which" to --which--.

Column 5, line 24, change "23" to --23--;
    line 26, change "γe'" to --γe--;
    line 27, change "γe" to --γe'--;
    line 38, change "γe'" to --γe--;
    line 39, change "γe" to --γe'--.

Column 9, line 2, change ",," to --,--;
    line 8, change "valve" to --value--;
    line 29, change "carded" to --carried--;
    line 32, change "show" to --shown--.

Column 13, line numbered 18, change "wheels" to --wheel--;
    line numbered 26, before "steering" insert --wheel--.

Signed and Sealed this

Eighteenth Day of February, 1997

Attest:

BRUCE LEHMAN

*Attesting Officer*   *Commissioner of Patents and Trademarks*